United States Patent [19]
Wilson et al.

[11] 3,831,746
[45] Aug. 27, 1974

[54] RECOVERING FILTER AID PARTICLES FROM FILTER CAKE

[76] Inventors: Peter C. Wilson, P.O. Box 561, Evergreen, Colo. 80439; Robert P. Hughart, 9451 E. Grand St., Englewood, Colo. 80110

[22] Filed: Aug. 2, 1971

[21] Appl. No.: 168,277

Related U.S. Application Data

[63] Continuation-in-part of Ser. No. 838,826, July 3, 1969, abandoned.

[52] U.S. Cl. .................................. 209/2, 209/211
[51] Int. Cl. ............................................. B03b 9/00
[58] Field of Search .................. 209/2, 211; 210/75; 134/25

[56] References Cited
UNITED STATES PATENTS

| | | | |
|---|---|---|---|
| 2,377,524 | 6/1945 | Samson et al. ........................ | 209/211 |
| 2,965,522 | 12/1960 | Crespin et al. ................... | 209/211 X |
| 3,392,835 | 7/1968 | Asper .................................. | 210/138 |
| 3,485,356 | 12/1969 | Burr .............................. | 209/211 X |
| 3,486,619 | 12/1969 | Grundelius et al. ................. | 209/211 |

*Primary Examiner*—Tim R. Miles
*Assistant Examiner*—Ralph J. Hill
*Attorney, Agent, or Firm*—Duane Burton

[57] ABSTRACT

A method of recovering filter aid particles from a filter cake and the reuse of filter aid particles reclaimed from a filter cake. The method of recovering filter aid particles involves separating from a diluted filter cake a substantial part of the filter aid particles by centrifuging the material, sequentially, in a plurality of spiral paths at a force varying between approximately 250–7000 times the force of gravity, while producing a vortex of gradually and constantly decreasing diameter and, prior to each separating step, diluting the filter cake by adding a liquid thereto and agitating and intermixing said material until the filter cake is substantially uniformly distributed throughout the liquid whereby substantially all of the filter aid particles are subjected to the cleansing action of said liquid. The method of recovering filter aid particles also involves the spinning of diluted filter cake, sequentially, in a plurality of paths to produce a vortex of gradually and constantly decreasing diameter at a velocity and for a sufficient period of time to separate from the slurried filter cake a substantial part of the filter aid particles and centrifuge same radially outwardly along the path but at a velocity less than that required to overcome the drag exerted by the material upon a substantial part of the remaining solids contained in the slurried filter cake, continuously withdrawing a portion of the material including the centrifuged filter aid particles from a point of minimum diameter of each of said paths, causing the balance of the material including entrained filter aid particles, to return freely and without obstruction in the opposite direction through the interior of the vortex to a point removed from the point of minimum diameter of the paths, and processing the balance of the material returned through the interior of the vortex associated with the first path by spinning same in a similar path thereby substantially increasing the amount of filter aid so recovered. The reusable filter aid particles reclaimed from the filter cake have a flow rate of at least approximately 2 1/2% greater than the relative flow rate of the unused filter aid particles used in forming said filter cake, at least approximately 10% greater than the flow rate of the unused filter aid particles used in forming said filter cake where said relative flow rate of said unused filter aid particles was approximately 10 or less, and at least approximately 20% greater than the flow rate of the unused filter aid particles used in forming said filter cake where said relative flow rate of said unused filter aid particles was approximately six or less.

5 Claims, 5 Drawing Figures

INVENTORS
PETER C. WILSON
ROBERT P. HUGHART

INVENTORS
PETER C. WILSON
ROBERT P. HUGHART

RECOVERING FILTER AID PARTICLES FROM FILTER CAKE

CROSS-REFERENCE TO RELATED APPLICATION

This is a continuation-in-part patent application of U.S. Patent application Ser. No. 838,826 filed on July 3, 1969, now abandoned.

BACKGROUND OF THE INVENTION

Filtration is an efficient and universally used means of separating solids from liquids. Filtration is effected by forcing a liquid through a porous member which serves to retain the solid particles. The material collected on the porous member is known as the filter cake.

Difficulties in filtration are generally of two types — low rate of flow and inadequate clarification. A filter aid is a material which serves to obtain or improve clarification or increase the filtration rate, or both. The fundamental function of filter aids is to provide a porous cake structure which is built up simultaneously with a deposition or retention of the suspended particles. The aggregate particles of the filter aid must, therefore, form a rigid skeleton or lattice structure which is capable of entraining the gelatinous or fine particles of the unfiltered liquid and yet leave channels in the filter cake through which the clarified liquid, freed of its suspended matter, may pass at a rate and under such pressure differentials as are practical economically. The filter aid particles should be of such character as to remain suspended in the liquid prior to the filtering step and must be microscopic in size to provide cakes which will filter out the small particles of colloidal suspensions.

Frequently used types of filter aids are diatomaceous silica and perlite. While diatomaceous silica is a truly descriptive name, during the many years it has been used industrially the material has been known by a number of other names such as kieselguhr, infusorial earth and diatomaceous earth. Today in the United States it is generally known in the trade as "diatomite." Diatomite is the fossilized remains— the "skeletons" or frustules — of long dead diatoms. Diatoms are not animal life, but microscopic one-celled marine plants, allied to algae, which have the ability to extract silica from the water in which they live and use it to construct an exoskeleton. It is these "skeletons" which form deposits of diatomite. Perlite is a dense, glassy rock formed by volcanic action. When crushed and heated under proper conditions it expands to 20 or more times its original volume. Filter aids of perlite are obtained by appropriate dry milling and dry classifying of the expanded perlite.

Heretofore, a primary use for filter aids has been in a filtration operation to remove "slime" particles, i.e., gelatinous, fine particles and other suspended matter, from a liquid thereby forming a filter cake. Although filter aids used in this manner have operated quite effectively, the use of filter aids in a filtration process has been disadvantageous generally from an expense viewpoint.

Photomicrographs of filter aid particles reveal that filter aid particles are cellular, porous, particulate matter and since the size of the slime particles is frequently substantially less than the size of the filter aid particles (the size of clay-like slime particles being less than approximately two microns while the size of the bulk of filter aid particles varies between approximately 10–100 microns), it was believed that the slime particles not only collected between the filter aid particles themselves but also became and remained entrapped inside individual filter aid particles.

Although the inventors only recently became aware of the existence of U.S. Pat. Nos. 2,965,522 and 3,392,835 which disclose attempts directed toward the separation of filter aid particles from filter cake, to the best of the inventors' knowledge these two attempts either have not been commercialized or have not been shown to be especially practical. The inventors are of the opinion that the two aforementioned attempts have not been accepted commercially because the quality of the product recovered in experiments has not been entirely satisfactory. The poor quality of the product obtained taken in combination with the percentage of the product actually recovered has probably been responsible for the failure of either of these attempts to be accepted commercially. However, the inventors have discovered that through the practice of the process of this invention the quality of the product as well as the per cent of product recovered can be considerably increased thereby overcoming the heretofore existing obstacles apparently preventing commercial acceptance of any process directed toward the recovery and reuse of filter aids from filter cake.

SUMMARY OF THE INVENTION

Filter aid particles are recovered from a filter cake by diluting the filter cake to form a material in liquid form, centrifuging the material, sequantially, in a plurality of spiral paths at a force varying between approximately 250 and 7000 times the force of gravity, while producing a vortex of gradually and constantly decreasing diameter and, prior to each separating step, diluting the filter cake by adding a liquid thereto to form a material containing, by weight, approximately 14 percent of solids or less, and agitating and intermixing said material until the filter cake is substantially uniformly distributed throughout the liquid whereby substantially all of the filter aid particles are subjected to the cleansing action of said liquid during the intermixing thereof. Filter aid particles are also removed from a filter cake by diluting the filter cake by adding a liquid thereto to form a material containing by weight, approximately 14 percent of solids or less, pressurizing the material to an amount varying between 10–200 psi spinning the pressurized material, sequentially, in a plurality of paths to produce a vortex of gradually and constantly decreasing diameter at a velocity and for a sufficient period of time to separate from the filter cake a substantial part of the filter aid particles and centrifuging same radially outwardly along each of the paths but at a velocity less than that required to overcome the drag exerted by the material upon a substantial part of the remaining solids contained in the filter cake, continuously withdrawing a portion of the material including the centrifuged filter aid particles from the point of minimum diameter of each of said paths, causing the balance of the material including entrained filter aid particles to return freely and without obstruction to the opposite direction through the interior of the vortex to a point removed from the point of minimum diameter of each of the paths, and reprocessing the balance of the material returned to the interior of the vortex associated with the first path by spinning same in a similar path thereby substantially increasing the amount of filter aid recovered.

Accordingly, one of the principal objects of this invention is to provide an improved method for recovering filter aid particles from a filter cake and reusable filter aid particles recovered thereby.

Another object of this invention is to provide a method as described above in which the step of diluting the filter cake includes adding sufficient liquid to form a material containing, on a dry weight basis, approximately 10 per cent or less of solids, i.e., filter cake including filter aid particles.

Another object of this invention is to provide reusable filter aid particles from a filter cake wherein said reusable filter aid particles have a flow rate at least approximately 2½ per cent greater than the flow rate of the previously unused filter aid particles used in forming said filter cake, at least approximately 10 per cent greater than the flow rate of the previously unused filter aid particles used in forming said filter cake where the relative flow rate of said unused filter aid particles was approximately ten or less, and at least approximately 20 per cent greater than the flow rate of the previously unused filter aid particles used in forming said filter cake where the relative flow rate of said unused filter aid particles was approximately six or less.

Another object of this invention is to provide reusable filter aid particles as aforedescribed in which the average size of the particles removable by said reclaimed filter aid particles is larger than the average size of particles removable by the previously unused filter aid particles used in forming said filter cake.

BRIEF DESCRIPTION OF THE DRAWINGS

The foregoing and other objects will become apparent from the specification and drawings in which.

DESCRIPTION OF THE PREFERRED EMBODIMENT

It will be understood that the term "cyclone" as used throughout this description and the claims refers to a liquid-solid or hydraulic cyclone. Additionally, with respect to the gravitational forces involved, it will be understood that the gravitational forces, as hereinafter referred to, are measured at the maximum path diameter at the section of the feed inlet of the cyclone and are calculated from the formula:

$$\text{gravitational force} = V^2 \div rg$$

where $r$ equals one-half of the maximum diameter of the path at the section feed inlet, $g$ equals 32.2 feet/second$^2$ and $V$ equals the velocity of the material flowing through the cyclone feed orifice in feet per second.

Figure 1:
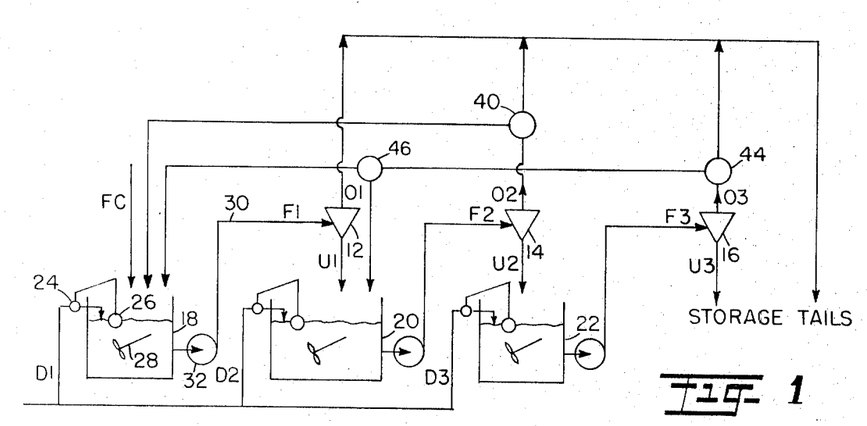
FIG. 1 is a schematic view of a three-stage apparatus used in practicing the method of this invention.
Figure 3:
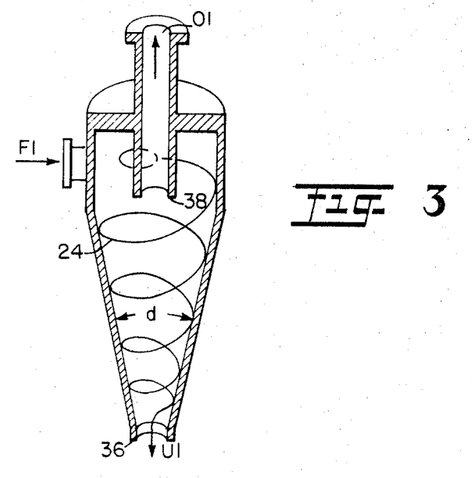
FIG. 3 is a perspective view, in partial cross section, showing a cyclone.

Referring now to the drawings, in FIG. 1 is shown a three-stage apparatus used in practicing one of the method of this invention. The apparatus includes a first stage cyclone 12, a second cyclone 14 and a third stage cyclone 16. Each of the cyclones has a cone included angle "α," see FIG. 3. The apparatus also includes agitation and intermixing tanks 18, 20, and 22. As shown, the first mixing tank 18 is constructed to receive the filter cake FC and dilution water D1. The amount of dilution water which is supplied to the mixing tank 18 is controlled by a valve 24 which is actuated by a float 26. An agitator 28 is disposed within the mixing tank 18. A conduit 30 connects the mixing tank 18 with the first stage cyclone 20. The conduit 30 includes a pump 32 which is used to transfer the mixture from the mixing tank 18 under a predetermined pressure, i.e., between 10 and 200 psi, to the first stage cyclone 12. Since the mixing tanks 20 and 22 are similar in construction to the function and operation of mixing tank 18, further discussion thereof is not deemed necessary. The same applies with respect to the conduits connecting the mixing tanks to their respective cyclones.

In FIG. 1, a filter cake FC, which includes filter aid particles intermixed with slime particles, is appropriately diluted with a liquid such as water D1, thoroughly agitated and intermixed and then pumped through conduit 30 to the first stage cyclone 12. Although the amount of time required to agitate and intermix the material within the mixing tank 18 may vary, it is preferred that the agitation and intermixing continue for at least approximately twenty seconds to insure that substantially all of the filter aid particles are subjected to the cleansing action of the liquid. The material F1 which is fed to the cyclone 12 is spun in an elongate arcuate path through the cyclone thereby producing a vortex of gradually and constantly decreasing diameter at a velocity and for a sufficient period of time to separate from the filter cake contained within the material a substantial part of the filter aid particles and centrifuge said filter aid particles radially outwardly along said path 34 (see FIG. 3) but at a velocity less than that required to overcome the drag exerted by the material upon a substantial part of the remaining solids in the filter cake. A portion of the material, including said centrifuged particles, is continuously withdrawn from the point of minimum diameter 36 of the path 34. The material so withdrawn is referred to as the underflow U1. The balance of the material, referred to as the overflow O1, returns freely and without obstruction in the opposite direction through the interior of the vortex to a point 28 removed from the point of minimum diameter 36 in path 34.

The cyclones 14 and 16 shown in FIG. 1 operate essentially independently of the cyclone 12 except, of course, that the second stage cyclone 14 receives the underflow U1 from the first stage cyclone 12 and the third stage cyclone 16 receives the underflow U2 from the second stage cyclone 14. The underflow U1 passes into the mixing tank 20 where same is appropriately diluted either through the addition of dilution water D2 or the overflow O3 from cyclone 16. The material within the mixing tank 20 is thoroughly agitated and intermixed to form a feed F2 which is fed into the cyclone 14. The underflow U2 is appropriately diluted with water D3. The material within the mixing tank 22 is thoroughly agitated and intermixed to form a feed F3 which is then fed into the cyclone 16. The filter aid particles are removed in the underflow U3 from the third stage cyclone 16 and transferred to a storage area. The overflow O1 for cyclone 12, designated as "tails," is discarded. The overflow O2 from cyclone 14 passes through a valve 40. Valve 40 is used to direct the overflow O2 to "tails" or into the mixing tank 18. The overflow O3 is directed to valve 44. Valve 44 is used to direct the overflow O3 either to "tails" or to valve 46. Valve 46 is used to direct the overflow O3 to either of the mixing tanks 18 or 20. During start up of the apparatus shown in FIG. 1, water will be supplied to each of the mixing tanks until a sufficient quantity of overflow O2 and O3 is being generated to dilute the filter cake FC and the underflows U1 and U2 as same are fed into their respective mixing tanks 20 and 22. Understandably, where the quantity of overflow O2 and O3 is not sufficient to dilute the filter cake FC and the underflows U1 and U2 as required, the additional amount of water is supplied from D1, D2, and D3. It will be appreciated, however, that a substantial reduction in the amount of make up water from D1, D2, and D3 is achieved by using the overflow O2 and 3 as indicated above. As a matter of fact, the use of the overflow from both the second and third cyclone stages will reduce the total water dilution requirements by about 66⅔ per cent, i.e., about 33⅓ per cent for each overflow so used.

In order to separate the filter aid particles from the slime particles in a cyclone, it has been found that certain requirements must be observed. For example, the velocity at which the material travels along the elongate arcuate path must be sufficiently great and maintained for a sufficient period of time to permit the filter aid particles to be centrifuged radially outwardly along the path but less than that required to overcome the drag exerted by the material upon the slime particles. It has been found that the foregoing is accomplished by using a cyclone wherein the maximum outer diameter of the arcuate path through which the material flows does not exceed an amount varying between approximately 0.25 inches and 4 inches. Preferably the maximum outer diameter of said arcuate path should not exceed an amount varying between approximately 0.3 inches and 3 inches and excellent results have been obtained where the maximum outer diameter of the arcuate path does not exceed an amount varying between approximately 0.35 inches and 2 inches. Since a higher percentage of recovery of the filter aid to the underflow is obtained with the smaller diameter of cyclones, the use of small diameter cyclones would be preferred except for the limiting factors encountered with respect to the size of the cyclone orifices. It is also preferred that the arcuate path adjacent the minimum diameter 36 thereof be circumscribed by a conically shaped envelope the sides of which, in longitudinal cross-section, form an included angle varying between approximately 2°–30° and preferably between approximitely 4°–20°. Since a higher percentage of recovery of the filter aid to the underflow is obtained with cyclones having lesser included cone angles, normally it would be anticipated that cyclones having a lesser included cone angle would be used; however, since a more dilute underflow results from the use of cyclones having a smaller included cone angle, which results in adversely affecting the efficiency of slime removal of the filter cake being processed through the cyclone, it has been concluded that somewhat larger than the minimum included cone angles should be used. A pressure differential of approximately 10 to 200 psi between the parts of the path 34 where the spinning of the material is initiated and the point 38 where the balance of the material passing through the interior of the vortex is removed should be maintained. However, even though a higher per cent of recovery of filter aid to the underflow will be achieved with larger operating pressure differentials, due to the interrelationship between the flow rate through and the pressure drop across the cyclone and the maintaining of adequate gravitational forces, it has been concluded that the pressure differential should be maintained between approximately 10 to 150 psi and, preferably, between approximately 10 to 100 psi.

Effective separation of filter aid particles from the slime particles within the cyclone is obtained when the material is processed at a force varying between approximately 250–7000 times the force of gravity. Since a higher slime removal efficiency and a higher recovery of the filter aid to the underflow is obtained through the use of larger gravitational forces, it would normally be expected that the filter cake would be processed through a cyclone in the upper portion of the above-referenced gravitational force range; however, the use of excessive gravitational forces coupled with long retention times may result in slime particles, of various specific gravities, responding to the excessive gravitational force such that said slime particles would no longer follow the water balance of the material being processed through the cyclone but instead would report as classified particulate to the cyclone underflow. Thus, it has been concluded that the material should be processed at a force varying between approximately 250 and 5500 times the force of gravity, and preferably between approximately 500 and 3500 times the force of gravity.

In order to separate or classify particles within a cyclone, the particles must be entrained or suspended within a body of fluid. Thus, in order to treat filter cake in accordance with the method of this invention, the filter cake must first be appropriately diluted. Since the slime particles follow the water balance when the filter cake is processed, within the gravitational force range specified herein, it will be understood that the more dilute (lower per cent solids by weight) the filter cake being fed to the cyclone the higher will be the slime removal efficiency. Thus, good results have been obtained by adding a liquid to the filter cake sufficiently to form a material containing, by weight up to approximately 14 per cent or less of the dry filter cake. Excellent results have been obtained where the filter cake has been diluted through the addition of a liquid thereto to form a material containing, by weight, up to approximately 10 per cent or less of the dry filter cake including filter aid particles. The results of past work indicate that the amount of solids contained in the portion of the material withdrawn from the minimum diameter of the cyclone should not exceed approximately 25 per cent solids, by weight.

The retention time, or the theoretical amount of time that it takes for material to travel through a cyclone, is dependent upon a number of related factors. For example, for a cyclone having a predetermined diameter, cone included angle and overall length, the retention time of such a cyclone can be varied by varying the inlet area to the cyclone, the diameter of the vortex finder used, and the pressure drop across the cyclone. The retention time is decreased by increasing the inlet area or by increasing the diameter of the vortex finder of by increasing the pressure drop across the cyclone or by a combination of the foregoing. It has been found that the retention time can vary considerably without adversely affecting the results obtained by practicing the method of this invention. For example, although the amount of retention time is relatively critical for a given cyclone, the amount of retention time may vary from as little as approximately 0.03 seconds to as much as approximately 0.30 seconds when operating within the limitations of the cyclone parameters as set forth herein.

Table I contains data obtained from processing, in the first stage cyclone only in accordance with the method of this invention, various grades of commercially available filter aid particles through various sizes of cyclones and under varying operating conditions.

Starting with the basic premises that slime particles follow the cyclone water balance, a high per cent volume of total material to overflow produces a high slime particle removal efficiency, and a high per cent solids in the underflow means that there are less slime particles in the underflow, it will be understood that the data set forth in the Table I enables the drawing of certain conclusions. First of all, the smaller the diameter of the cyclone involved, the higher will be the per cent recovery of filter aids to the underflow. Secondly, the smaller the inlet area involved, the higher will be the efficiency of slime particle removal and the per cent of recovery of the filter aid particles to the underflow will also be greater. A higher slime particle removal efficiency will be obtained by using larger diameter vortex finders; also, a higher per cent recovery of the filter aid particles to the underflow is obtained through the use of small diameter vortex finders. Further, the smaller the diameter of the apex, the lower the per cent of recovery of filter aid particles to the underflow but less slime particles will be included within such underflow; the larger the diameter of the apex, the higher the per cent of recovery of filter aid particles to the underflow but larger amounts of slime particles will also be found in the underflow. The higher the pressure drop across the cyclone, the higher will be the efficiencies of slime particle removal as well as per cent of recovery of filter aid particles to the underflow. Increasing the amount of gravitational forces involved produces a better wash efficiency and a better recovery of the filter aid particles to the underflow. Finally, the coarser the grade of filter aid particles used (i.e., filter aid particles having relatively high flow rates), the higher will be the percentage of recovery of filter aid particles to the underflow.

Figure 4:
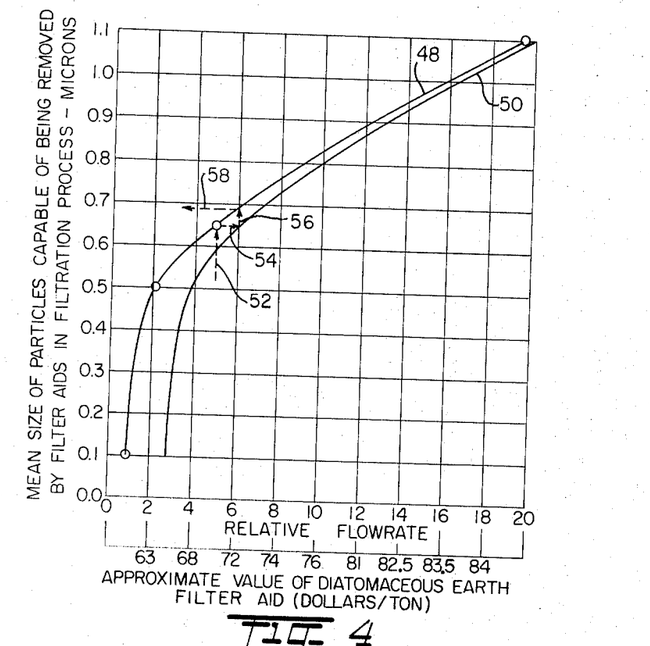
FIG. 4 is a graph showing the results of processing filter aids through a three-stage apparatus in accordance with the method of this invention with respect to the relative flow rate and particle size removal characteristics, and the monetary value value of the filter aids prior and subsequent to processing thereof.

FIG. 4 is a graph showing the relative flow rate and mean size of slime particles capable of being removed (by use of the filter aid during the filtration process) of both new or unused filter aid particles and reclaimed or reprocessed filter aid particles, and the approximate value (dollars per ton, carload lots, f.o.b. Lompoc, California, in mid 1969) of filter aid particles prior to and subsequent to processing thereof. The curve 48 is an approximation of these two characteristics for new or unused filter aid particles. The curve 50 is an approximation of the reclaimed or reprocessed filter aid particles which have been processed through the apparatus shown in FIG. 1 in accordance with the method of this

TABLE I

| | Cyclone dimensions | | | | | Operation and performance data | | | | | | | | Unused filter aid data | | |
|---|---|---|---|---|---|---|---|---|---|---|---|---|---|---|---|---|
| Example | Max. Cyclone dia. (inches) | Feed inlet area (inches) | Vortex finder dia. (inches) | Area dia. (inches) | Cone included angle (degrees) | Feed pressure (p.s.i.) | Overflow pressure (p.s.i.) | Underflow pressure (p.s.i.) | Inlet C's × gravity | Feed, percent solids by weight | Overflow, percent solids by weight | Underflow, percent solids by weight | Percent recovery of filter aid solids to underflow | Percent volume split o'flow/u'flow | Filter aid grade Johns-Manville* | Relative flow rate as filter aid | Micron size removal as filter aid |
| 1 | 1.0 | 0.035 | 0.375 | 0.188 | 5°–30′ | 20 | 0 | 0 | 900 | 5.02 | 2.71 | 14.80 | 55.0 | 80/20 | Hyflo Super-Cel | 5.0 | 0.65 |
| 2 | 1.0 | 0.035 | 0.250 | 0.125 | 5°–30′ | 40 | 0 | 0 | 1,760 | 5.50 | 1.57 | 20.20 | 77.5 | 77/23 | ...do... | 5.0 | 0.65 |
| 3 | 1.0 | 0.047 | 0.312 | 0.125 | 5°–30′ | 40 | 0 | 0 | 945 | 4.43 | 0.40 | 24.70 | 92.5 | 85/15 | Celite 545 | 19.5 | 1.1 |
| 4 | 1.0 | 0.047 | 0.312 | 0.125 | 5°–30′ | 40 | 0 | 0 | 945 | 3.82 | 1.86 | 18.50 | 57.0 | 89/11 | Hyflo Super-Cel | 5.0 | 0.65 |
| 5 | 1.0 | 0.047 | 0.312 | 0.125 | 5°–30′ | 40 | 0 | 0 | 945 | 4.33 | 3.22 | 15.20 | 32.6 | 91/9 | Standard Super-Cel | 2.1 | 0.5 |
| 6 | 1.04 | 0.00757 | 0.098 | 0.091 | 7°–52′ | 40 | 0 | 0 | 945 | 4.03 | 3.28 | 9.60 | 28.2 | 96.5/3.6 | Filter Cel | 1.0 | 0.1 |
| 7 | 0.394 | 0.00757 | 0.098 | 0.091 | 7°–52′ | 40 | 0 | 0 | 1,645 | 4.32 | 0.58 | 7.78 | 93.5 | 50/50 | Hyflo Super-Cel | 5.0 | 0.65 |
| 8 | 0.394 | 0.047 | 0.312 | 0.125 | 5°–30′ | 40 | 0 | 0 | 1,645 | 4.35 | 0.52 | 7.85 | 94.4 | 50/50 | ...do... | 5.0 | 0.65 |
| 9 | 1.0 | 0.047 | 0.312 | 0.125 | 5°–30′ | 80 | 0 | 0 | 945 | 4.48 | 2.02 | 20.30 | 61.0 | 83/17 | ...do... | 5.0 | 0.65 |
| 10 | 1.0 | 0.035 | 0.250 | 0.188 | 5°–30′ | 80 | 0 | 0 | 3,200 | 4.30 | 0.99 | 17.84 | 81.5 | 82/18 | ...do... | 5.0 | 0.65 |
| 11 | 1.0 | 0.035 | 0.250 | 0.250 | 5°–30′ | 80 | 0 | 5 | 3,200 | 5.05 | 0.72 | 11.60 | 82.0 | 60/40 | ...do... | 5.0 | 0.65 |
| 12 | 1.0 | 0.035 | 0.250 | 0.250 | 5°–30′ | 80 | 0 | 0 | 3,200 | 4.68 | 0.56 | 8.48 | 95.2 | 30/50 | ...do... | 5.0 | 0.65 |
| 13 | 1.0 | 0.035 | 0.250 | 0.250 | 5°–30′ | 80 | 0 | 22 | 3,200 | 4.30 | 0.70 | 8.78 | 92.5 | 60/40 | ...do... | 5.0 | 0.63 |
| 14 | 1.0 | 0.035 | 0.250 | 0.250 | 5°–30′ | 80 | 0 | 30 | 3,200 | 4.30 | 1.03 | 16.00 | 81.4 | 80/20 | ...do... | 5.0 | 0.65 |
| 15 | 1.0 | 0.035 | 0.250 | 0.250 | 5°–30′ | 80 | 0 | 0 | 3,200 | 4.15 | 1.07 | 20.52 | 78.2 | 88/12 | ...do... | 5.0 | 0.65 |

*Johns-Manville Product Corp. trademark designation for its grades of filter aids, see Johns-Manville's brochure "Filter Aids & Mineral Fillers", DS Series 450.

invention. As shown in FIG. 4, if new or unused filter aid particles having a relative flow rate of 5.0 are processed through a three-stage apparatus in accordance with the method of this invention, the reclaimed or recovered filter aid particles will have a relative flow rate of approximately 6.0. This is determined by noting the point where curve 48 intersects a vertical line associated with a relative flow rate of 5.0, represented by the broken arrow 52, and then proceeding horizontally to curve 50, as represented by broken arrow 54. The vertical line passing through the point where the broken arrow 54 intersects the curve 50 is associated with the relative flow rate of the reprocessed or recovered filter aid particles which have been processed through a three-stage apparatus in accordance with the method of this invention. As shown in FIG. 4, the broken arrow 54 intersects curve 50 along the vertical line associated with a relative flow rate of approximately 6.0. Just as there is an increase in relative flow rate by reprocessing or recovering filter aid particles in accordance with the method of this invention, there is a corresponding change in the mean size of particles which can be removed by such reprocessed or reclaimed filter aid particles. As shown in curve 48 of FIG. 4 where new or unused filter aid particles, which are capable of removing particles having a mean size of approximately 0.65 microns, are processed through the apparatus shown in FIG. 1 in accordance with the method of this invention, the filter aid particles which are reclaimed or recovered are capable of removing particles having a mean size of approximately 0.68 microns. The latter information is found by beginning with the point of interception of broken arrow 54 and curve 50 and then moving vertically upwardly, such as by broken arrow 56, to curve 48. At the point of interception of broken arrow 56 and curve 48, a horizontal line, as represented by broken arrow 58, indicates the mean size removed particle rating for the recovered or reclaimed filter aid particles processed through a three-stage apparatus in accordance with the method of this invention.

It will be noted from FIG. 4 that the monetary value or cost of diatomaceous earth filter aid particles increases with an increase in the relative flow rate of the filter aid particles. This is to be expected if the flow rate characteristic of filter aid particles is proportional to the amount of liquid which can be processed therethrough for a predetermined period of time. For example, filter aid particles having higher flow rate characteristics have a higher permeability which is a measure of the size and number of interconnected voids in the filter cake. It has been found that processing filter aid particles in accordance with the method of this invention results in a reduction in the amount of small sized filter aid particles being recovered at the underflow and that this reduction of small sized filter aid particles from the recovered filter aid particles results in a corresponding increase in flow rate from the recovered filter aid particles. Understandably, with an increase in flow rate for the reclaimed filter aid particles there is a corresponding increase in the mean size of removed particles characteristic for the reclaimed filter aid particles. In view of the foregoing, it will be readily appreciated that filter aid particles recovered in accordance with the method of this invention not only have increased flow rate characteristics but also an increased value as a result thereof. For example, as shown in FIG. 4, a reclaimed or reprocessed filter aid having a flow rate characteristic of approximately 6.0 will have a value of approximately $72.00 per ton as compared with a value of approximately $70.00 per ton for the new or unused filter aid particles which were processed in accordance with the method of this invention to produce the filter aid particles so reclaimed. Finally, as previously indicated, although curve 50 is an approximation of certain characteristics of filter aid particles reclaimed in accordance with the method of this invention, it will be noted that the flow rate characteristic of reclaimed or recovered filter aid particles is equal to at least approximately two and one-half per cent or more of the flow rate of previously unused filter aid particles used in forming the filter cake which was used in obtaining the reclaimed or recovered filter aid particles, at least approximately 10 per cent greater than the flow rate of the unused filter aid particles used in forming the filter cake where the relative flow rate of said unused filter aid particles was approximately ten or less, and at least approximately 20 per cent greater than the flow rate of the unused filter aid particles used in forming the filter cake where the relative flow rate of said unused filter aid particles was approximately six or less.

Figure 5:
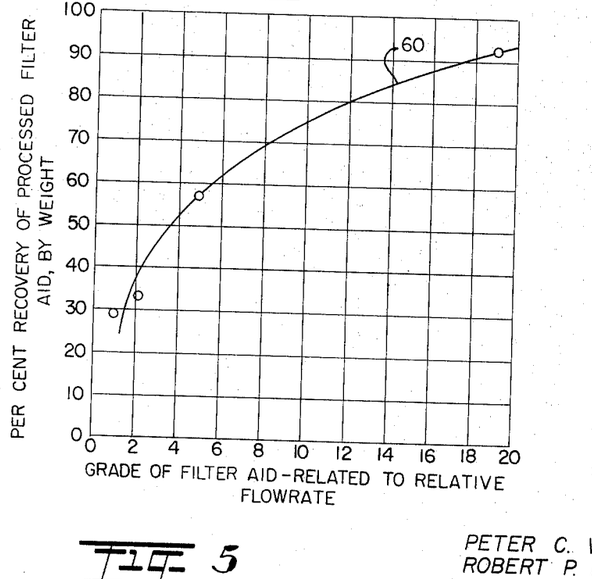
FIG. 5 is a graph showing the per cent of recovery of filter aids, processed through the first stage of an apparatus in accordance with this invention, relative to filter aids of various flow rates.

FIG. 5 is a graph showing curve 60 which is an approximation of the percentage of recovery obtained by processing new or unused filter aid particles through the first stage cyclone of the apparatus shown in FIG. 1, in accordance with the method of this invention, as compared to the relative flow rates for the filter aids involved. For example, as shown by curve 60 in FIG. 5 it is to be expected that approximately 57 percent of the new or unused filter aids, having a relative flow rate of 5.0, will be recovered in the cyclone underflow when same are processed through a single stage apparatus in accordance with the method of this invention for a predetermined set of operating conditions which, for the graph of FIG. 5, are as follows:

$g = 945$
$\Delta P = 40$ psi cyclone
max. diam. $= 1''$ cone included angle $(\alpha) = 5°30'$
% solids feed $= 3.82$–$4.83\%$ retention time $= 0.157$ seconds (theoretically calculated)

Figure 2:
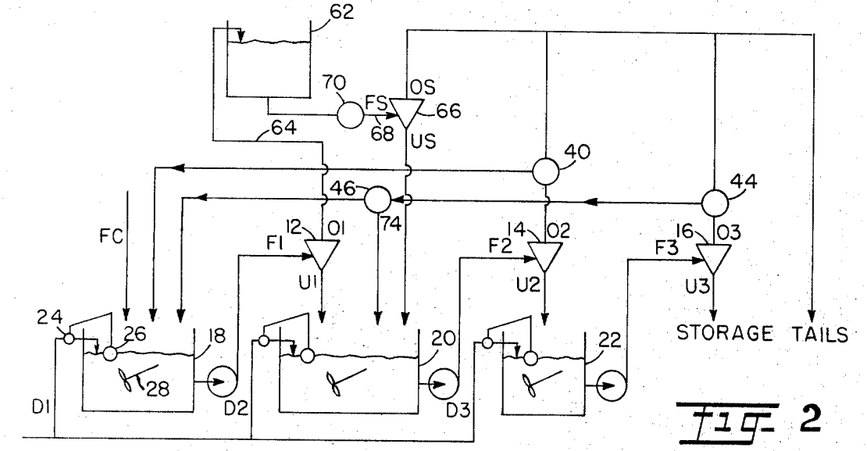
FIG. 2 is a schematic view of a preferred three-stage apparatus used in practicing the method of this invention and including a scavenger cyclone for processing the overflow from the cyclone in the first stage.

In FIG. 2 is shown an apparatus similar to that shown in FIG. 1 with the exception that the overflow from the first stage cyclone 12 is fed into a holding tank 62 rather than being discarded as "tails." Conduit 64 interconnects the first stage cyclone 12 and the holding tank 62. The apparatus of FIG. 2 also includes a scavenger cyclone 66. The preferred process of this invention involves the use of a scavenger cyclone. A conduit 68 interconnects the holding tank 62 and the scavenger cyclone 66. The conduit 68 includes a pump 70. The material within the holding tank 62 forms a feed FS that is fed to the scavenger cyclone 66. The underflow US from cyclone 67 is directed toward the mixing tank 20. The overflow OS from cyclone 66 is discarded as "tails." The overflow O2 from the second stage cyclone 14 passes through a valve 40. Valve 40 is used to direct the overflow O2 either to "tails" or to mixing tank 18. The overflow O3 passes through valve 44. Valve 44 is used to direct the overflow O3 either to "tails" or to valve 46. Valve 46 is used to direct the overflow O3 either to mixing tank 20 or to mixing tank 18.

Depending upon the amount of solids contained in the feed FI that is fed to the first stage cyclone, operation of the apparatus shown in FIG. 2 can be used to recover up to approximately 30 per cent more of the total amount of filter aid fed to the first stage cyclone. Additionally, it has been found that the use of a scavenger cyclone in the apparatus as shown in FIG. 2 is beneficial from an operational viewpoint because the scavenger cyclone will function as the first stage cyclone should the point of minimum diameter 36 of the path of the first stage cyclone become clogged up or choked off. This can occur where a relatively high per cent of solids is included in the feed F1. It has been found that the amount of solids contained in the feed F1 affects the additional amount of filter aids to be recovered in the underflow US from the scavenger cyclone. For example, the greater the amount of solids contained in the feed F1 fed to the first stage cyclone, the more different it is for the first stage cyclone to effect an efficient separation of the filter aid particles from the material being processed therein and, thus, the greater the amount of filter aids that will be recovered in the underflow US from the scavenger cyclone.

The filter aid particles recovered through the process of this invention exhibit the same properties as that used initially in making the filter cake from which same was recovered except that the flow rate is improved and the average size of the particles removable by said reclaimed filter aid particles is somewhat larger than the average size of particles removable by the previously unused filter aid particles (used in forming the filter cake). Although it is believed that a substantial part of slime particles are entraped within the original filter aid particles recovered through the process of this invention, to the extent that any such slime entrapment does occur, it has been found that there is little or no adverse effect in using such recovered filter aid particles in subsequent filtration operations.

In view of all the foregoing, it will now be readily appreciated that an improved method of recovering filter aid particles from a filter cake and of increasing the flow rate of recovered filter aid particles has been described. Additionally the reclaimed or recovered filter aid particles obtained in accordance with the foregoing method have improved characteristics as comparared to the filter aid particles from which same were reclaimed. As a result of this invention, it is now possible to reduce the expense heretofore associated with the filtration of liquids through the use of filter aids since the filter aid particles can be recovered following each use and used again. The recovery of filter aid particles will enable users thereof to reduce the loads heretofore imposed upon the sewage systems through which same were disposed or, where the expended filter cake had been dumped on open ground, reduces the requirement heretofore existing for increasing areas of valuable land. The recovery of filter aid particles in accordance with the method of this invention may be achieved with equipment which is relatively inexpensive and occupying a relatively small amount of space.

It is to be understood that this invention is not limited to the exact methods shown and described, which are merely by way of illustration and not limitation, as various other methods will be apparent to those skilled in the art. For example, it will be understood that filter aid particles may be recovered by processing filter cakes through a multistage system exceeding the number of stages which have been described herein and the overflow of each of the various stage cyclones may be processed in the same manner as the overflow from the first stage cyclone described above. Such processing would increase the amount of filter aid particles that can be recovered.

We claim:

1. A method of recovering filter aid particles from filter cake, said method comprising the steps of:
   a. diluting said filter cake by adding a liquid thereto to form a material containing, by weight, approximately 14 per cent of solids or less;
   b. pressurizing the material referred to in the preceding step to a pressure varying between 10 to 200 psi;
   c. spinning said pressurized material in a first elongate arcuate path to produce a vortex of gradually and constantly decreasing diameter at a velocity and for a sufficient period of time to separate from the filter cake a substantial part of the filter aid particles and centrifuge same radially outwardly along said path but at a velocity less than that required to overcome the drag exerted by the material upon a substantial part of the remaining solids contained in said filter cake;
   d. continuously withdrawing a portion of said material including said centrifuged filter aid particles from a point of minimum diameter of said first path;
   e. causing the balance of said material, including entrained filter aid particles, to return freely and without obstruction in the opposite direction through the interior of the vortex to a point removed from the point of minimum diameter of said first path;
   f. pressurizing said balance of material to a pressure varying between 10 to 200 psi and then spinning same in a second elongate arcuate path to produce a vortex of gradually decreasing diameter at a velocity and for a sufficient period of time to separate from said balance of material a portion of the filter aid particles contained therein and centrifuge same radially outwardly along said path but at a velocity less than that required to overcome the drag exerted by the remaining balance of material upon a substantial part of the remaining solids contained in said balance of material;
   g. continuously withdrawing a portion of said balance of material including said centrifuged particles from a point of minimum diameter of said second path;
   h. causing the remaining portion of said balance to return freely and without obstruction in the opposite direction through the interior of the vortex to a point removed from the point of minimum diameter of said second path;
   i. diluting the material withdrawn from the point of minimum diameter of said first and second paths by adding a liquid thereto to form a material containing, by weight, approximately 14 per cent of solids or less;
   j. pressurizing the material referred to in the preceding step to a pressure varying between 10 to 200 psi;
   k. spinning the material referred to in the preceding step in a third elongate arcuate path to produce a vortex of gradually and constantly decreasing diameter at a velocity and for a sufficient period of time to separate from the filter cake contained therein a substantial part of the filter aid particles and centrifuge same radially outwardly along said path but at a velocity less than that required to overcome the drag exerted by the material upon a substantial part of the remaining solids contained in said filter cake;

l. continuously withdrawing a portion of said material including said centrifuged particles from a point of minimum diameter of said third path;

m. causing the balance of said material to return freely and without obstruction in the opposite direction through the interior of the vortex to a point removed from the point of minimum diameter of said third path;

n. diluting the material withdrawn from the point of minimum diameter of said third path by adding a liquid thereto to form a material containing, by weight, approximately 14 per cent of solids or less;

o. pressurizing the material referred to in the preceding step to a pressure varying between 10 to 200 psi;

p. spinning the material referred to in the preceding step in a fourth elongate arcuate path to produce a vortex of gradually and constantly decreasing diameter at a velocity and for a sufficient period of time to separate from the filter cake contained therein a substantial part of the filter aid particles and centrifuge same radially outwardly along said path but at a velocity less than that required to overcome the drag exerted by the material upon a substantial part of the remaining solids contained in said filter cake;

q. continuously withdrawing the material including said centrifuged particles from the point of minimum diameter of said fourth path; and r. causing the balance of said material to return freely and without obstruction in the opposite direction through the interior of the vortex to a point removed from the point of minimum diameter of said fourth path.

2. A method as described in claim 1 in which each diluting step includes agitating and intermixing the filter cake and liquid until said filter cake is substantially uniformly distributed throughout said liquid whereby substantially all of the filter aid particles are subjected to the cleansing action of the liquid.

3. A method as described in claim 1 including the additional steps of:
using the balance of material passing through the vortex associated with said third path to dilute the filter cake referred to in the first step of claim 4 above; and
using the balance of material passing through the vortex associated with said fourth path to dilute the material withdrawn from the minimum diameter of said first and second paths.

4. A method as described in claim 1 above including the additional step of using the material passing through the vortex associated with said fourth path to dilute either the material withdrawn from the minimum diameter of said first path or the filter cake that is to be spun in said first path.

5. A method of recovering filter aid particles from filter cake, said method comprising the steps of:

a. diluting said filter cake by adding a liquid thereto to form a material containing, by weight, approximately 14 per cent of solids or less;

b. pressurizing the material referred to in the preceding step to a pressure varying between 10 to 200 psi;

c. spinning said pressurized material in a first elongate arcuate path to produce a vortex of gradually and constantly decreasing diameter at a velocity and for a sufficient period of time to separate from the filter cake a substantial part of the filter aid particles and centrifuge same radially outwardly along said path but at a velocity less than that required to overcome the drag exerted by the material upon a substantial part of the remaining solids contained in said filter cake;

d. continuously withdrawing a portion of said material including said centrifuged filter aid particles from a point of minimum diameter of said first path;

e. causing the balance of said material, including entrained filter aid particles, to return freely and without obstruction in the opposite direction through the interior of the vortex to a point removed from the point of minimum diameter of said first path;

f. pressurizing said balance of material to a pressure varying between 10 to 200 psi and then spinning same in a second elongate arcuate path to produce a vortex of gradually decreasing diameter at a velocity and for a sufficient period of time to separate from said balance of material a portion of the filter aid particles contained therein and centrifuge same radially outwardly along said path but at a velocity less than that required to overcome the drag exerted by the remaining balance of material upon a substantial part of the remaining solids contained in said balance of material;

g. continuously withdrawing a portion of said balance of material including said centrifuged particles from a point of minimum diameter of said second path;

h. causing the remaining portion of said balance to return freely and without obstruction in the opposite direction through the interior of the vortex to a point removed from the point of minimum diameter of said second path;

i. diluting the material withdrawn from the point of minimum diameter of said first and second paths by adding a liquid thereto to form a material containing, by weight, approximately 14 per cent of solids or less;

j. pressurizing the material referred to in the preceding step to a pressure varying between 10 to 200 psi;

k. spinning the material referred to in the preceding step in a third elongate arcuate path to produce a vortex of gradually and constantly decreasing diameter at a velocity and for a sufficient period of time to separate from the filter cake contained therein a substantial part of the filter aid particles and centrifuge same radially outwardly along said path but at a velocity less than that required to overcome the drag exerted by the material upon a substantial part of the remaining solids contained in said filter cake;

l. continuously withdrawing a portion of said material including said centrifuged particles from a point of minimum diameter of said third path; and m. causing the balance of said material to return freely and without obstruction in the opposite direction through the interior of the vortex to a point removed from the point of minimum diameter of said third path.

\* \* \* \* \*

UNITED STATES PATENT OFFICE
CERTIFICATE OF CORRECTION

Patent No. 3,831,746     Dated August 27, 1974

Inventor(s) Peter C. Wilson, et al

It is certified that error appears in the above-identified patent and that said Letters Patent are hereby corrected as shown below:

Table 1, Column 5, "Area" should read -- Apex --.

Table 1, Column 10, "C's" should read -- G's --.

Table 1, Column 13, Example 13, "8.78" should read -- 8.76 --.

Table 1, Column 15, Example 6, "96.5/3.6" should read -- 96.5/3.5 --.

Table 1, Column 18, Example 13, "0.63" should read -- 0.65 --.

Column 13, line 51, "4" should read -- 1 --.

Signed and sealed this 7th day of January 1975.

(SEAL)
Attest:

McCOY M. GIBSON JR.
Attesting Officer

C. MARSHALL DANN
Commissioner of Patents